(12) United States Patent
Ahnoff et al.

(10) Patent No.: US 12,150,465 B2
(45) Date of Patent: Nov. 26, 2024

(54) NUTRITIONAL SUPPLEMENTS

(71) Applicant: LAMINARIA GROUP AB, Gothenburg (SE)

(72) Inventors: Martin Ahnoff, Gothenburg (SE); Mårten Fryknäs, Knivsta (SE)

(73) Assignee: LAMINARIA GROUP AB, Gothenburg (SE)

( * ) Notice: Subject to any disclaimer, the term of this patent is extended or adjusted under 35 U.S.C. 154(b) by 992 days.

(21) Appl. No.: 17/041,368

(22) PCT Filed: Mar. 27, 2019

(86) PCT No.: PCT/EP2019/057773
§ 371 (c)(1),
(2) Date: Sep. 24, 2020

(87) PCT Pub. No.: WO2019/185742
PCT Pub. Date: Oct. 3, 2019

(65) Prior Publication Data
US 2021/0015125 A1  Jan. 21, 2021

(30) Foreign Application Priority Data
Mar. 27, 2018 (SE) .................... 1830102-8

(51) Int. Cl.
*A23L 2/52* (2006.01)
*A23L 29/256* (2016.01)
(Continued)

(52) U.S. Cl.
CPC ............... *A23L 2/52* (2013.01); *A23L 29/256* (2016.08); *A23L 33/125* (2016.08); *A23L 33/16* (2016.08); *A23L 33/30* (2016.08); *A23V 2002/00* (2013.01)

(58) Field of Classification Search
CPC ....... A23L 33/125; A23L 29/256; A23L 33/16
See application file for complete search history.

(56) References Cited

U.S. PATENT DOCUMENTS 2,935,409 A   5/1960  McDowell et al.
5,866,190 A   2/1999  Barey
(Continued)

FOREIGN PATENT DOCUMENTS

DE   29701817 U1   3/1997
EP   2098124 A1    9/2009
(Continued)

OTHER PUBLICATIONS

American College of Sports Medicine, "Nutrition and Athletic Performance", American Dietetic Association Dietitians of Canada, Medicine & Science in Sports & Exercise, 2009, DOI: 10.1249/MSS.0b013e318190eb86, pp. 709-731.
(Continued)

*Primary Examiner* — Jenna A Watts
(74) *Attorney, Agent, or Firm* — James S. Keddie; Bozicevic, Field & Francis LLP

(57) ABSTRACT

The present invention provides nutritional supplements consisting of an alginate hydrogel with sub-saturating amounts of calcium ions and comprising an aqueous solution comprising active ingredients, selected from sugars, complex carbohydrates, electrolytes, caffeine, and amino acids. The nutritional supplements allow for intake of carbohydrates without causing oral pH lowering and risk of dental caries, and without causing gastrointestinal discomfort while maintaining a high rate of intestinal uptake and oxidation of carbohydrates.

30 Claims, 5 Drawing Sheets

Figure 1:
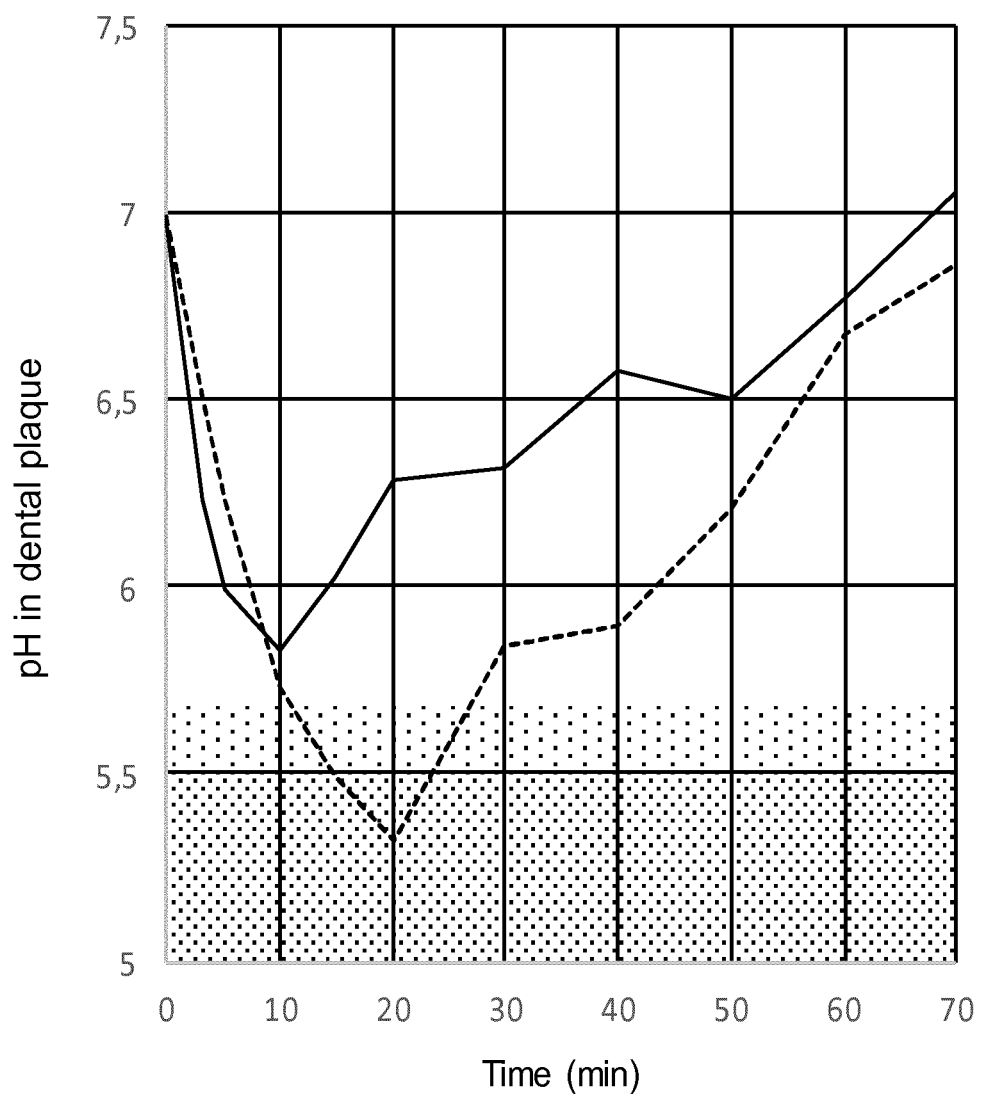

(51) Int. Cl.
  *A23L 33/00* (2016.01)
  *A23L 33/125* (2016.01)
  *A23L 33/16* (2016.01)

(56) References Cited

U.S. PATENT DOCUMENTS

| | | | |
|---|---|---|---|
| 5,980,968 | A | 11/1999 | Booth |
| 6,165,503 | A | 12/2000 | Gåserød et al. |
| 6,451,351 | B1 | 9/2002 | Kawashima et al. |
| 2003/0118712 | A1 | 6/2003 | Koren et al. |
| 2005/0137272 | A1 | 6/2005 | Gaserod et al. |
| 2005/0170059 | A1 | 8/2005 | Aldred et al. |
| 2006/0159823 | A1* | 7/2006 | Melvik ............ A61L 27/20 426/106 |
| 2007/0082029 | A1 | 4/2007 | Aimutis et al. |
| 2007/0082114 | A1 | 4/2007 | Catani |
| 2009/0155409 | A1 | 6/2009 | Sexton et al. |
| 2011/0195157 | A1 | 8/2011 | Niichel |
| 2014/0037830 | A1 | 2/2014 | Sexton et al. |
| 2015/0118365 | A1 | 4/2015 | Hollenkamp |
| 2016/0143330 | A1 | 5/2016 | Noue et al. |
| 2018/0000743 | A1 | 1/2018 | Welker et al. |

FOREIGN PATENT DOCUMENTS

| | | |
|---|---|---|
| GB | 605455 A | 7/1948 |
| GB | 1369198 A | 10/1974 |
| GB | 1369199 A | 10/1974 |
| JP | S47-11970 A | 6/1972 |
| JP | 2015089357 A | 5/2015 |
| SE | 512093 C2 | 1/2000 |
| WO | WO 98/20755 A1 | 5/1998 |
| WO | WO 99/56563 A2 | 11/1999 |
| WO | WO 02/094224 A1 | 11/2002 |
| WO | WO 2005/020719 A1 | 3/2005 |
| WO | WO 2007/039294 A2 | 4/2007 |
| WO | WO 2007/044511 A1 | 4/2007 |
| WO | WO 2008/022857 A1 | 2/2008 |
| WO | WO 2011/063817 A2 | 6/2011 |
| WO | WO 2011/071699 A1 | 6/2011 |
| WO | WO 2014/209106 A1 | 12/2014 |
| WO | WO 2017/186940 A1 | 11/2017 |
| WO | WO 2017/186948 A1 | 11/2017 |

OTHER PUBLICATIONS

Ashley et al., "Oral health of elite athletes and association with performance: a systematic review", Br J Sports Med, 2015, 49:14-19.
Jeukendrup, "Carbohydrate feeding during exercise", European Journal of Sport Science, 2008, 8(2): 77-86.
Li et al., "Designing hydrogels for controlled drug delivery", Nat Rev Mater., 2016, 1(12): doi:10.1038/hatrevmats.2016.71.
McEntee et al., "Tunable Transport of Glucose Through Ionically-Crosslinked Alginate Gels: Effect of Alginate and Calcium Concentration", Journal of Applied Polymer Science, 2008, 107(5): 2956-2962.
Msagati, Microencapsulation and Bioencapsulation, Chemistry of Food Additives and Preservatives, First Edition, 2013, pp. 295-313.
Needleman et al., "Oral Health and elite sport performance", Br J Sports Med, 2015, 49:3-6.
Pfeiffer et al., "Nutritional Intake and Gastrointestinal Problems during Competitive Endurance Events", Medicine & Science in Sports & Exercise, 2012, pp. 344-351.
"Nutrition and Athletic Performance", American College of Sports Medicine, American Dietetic Association Dietitians of Canada, Official Journal of the American College of Sports Medicine, pp. 709-731.
Khoury et al., "Effect of sodium alginate addition to chocolate milk on glycemia, insulin, appetite and food intake in healthy adult men", European Journal of Clinical Nutrition, 2014, 68: 613-618.
Hoad et al., "Human Nutrition and Metabolism, In Vivo Imaging of Intragastric Gelation and Its Effect on Satiety in Humans", American Society for Nutritional Sciences, 2004, pp. 2293-2300.
Barber et al., "Pectin-Alginate Does Not Further Enhance Exogenous Carbohydrate Oxidation in Running", Medicine & Science in Sports & Exercise, 2019, Publish Ahead of Print, DOI: 10.1249/MSS.0000000000002262.
Paxman et al., "Daily ingestion of alginate reduces energy intake in free-living subjects", Appetite, 2008, 51: 713-719.
Pelkman et al., "Novel calcium-gelled, alginate-pectin beverage reduced energy intake in nondieting overweight and obese women: interactions with dietary restraint status", Am J Clin Nutr, 2007, 86:1595-1602.
Marciani et al., "Alginate and HM-pectin in sports-drink give rise to intra-gastric gelation in vivo", Food & Function, 2019, 10: 7892.
International-Type Search Report issued for Swedish Patent Application No. 1630098-0, mailed Jun. 12, 2016.
Swedish Search Report issued for Swedish Patent Application No. 1730056-7, mailed Sep. 15, 2017.
Oliveira et al., "Carbohydrate-Dependent, Exercise-Induced Gastrointestinal Distress", Nutrients, 2014, 6: 4191-4199.
Rowe et al., "Glucose and Fructose Hydrogel Enhances Running Performance, Exogenous Carbohydrate Oxidation and Gastrointestinal Tolerance", Med Sci Sports Exerc. Jul. 3, 20210. doi: 10.1249/MSS.0000000000002764. Epub ahead of print. PMID: 34334720.
Third Party Observation for European patent application No. EP20170720136, submitted on Jun. 17, 2019.
Third Party Observation for European patent application No. EP20170720136, submitted on Jun. 26, 2019.
Grant et al., "Biological Interactions Between Polysaccharides and Divalent Cations: the Egg-Box Model", Febs Letters, 1973, 32(1): 195-198.
Ström et al., "Physico-Chemical Properties of Hydrocolloids Determine Their Appetite Effects", In Gums and stabilizers for the food industry 15, Eds. P. A. Williams, G. O. Phillips, Royal Chemical Society, 2009, pp. 341-355.
Wan et al., "Calcium Concentration Effects on the Mechanical and Biochemical Properties of Chondrocyte-Alginate Constructs", Cell Mol Bioeng., 2008, 1(1): 93-102. doi: 10.1007/s12195-008-0014-x.

* cited by examiner

NUTRITIONAL SUPPLEMENTS

CROSS-REFERENCE TO RELATED APPLICATIONS

This application is a § 371 national phase of International Application No. PCT/EP2019/057773, filed on Mar. 27, 2019, which claims the benefit of Swedish Patent Application No. 1830102-8, filed on Mar. 27, 2018, which applications are incorporated by reference herein.

TECHNICAL FIELD OF THE INVENTION

The invention is concerned with the technical field of nutritional supplements, and more specifically to sports drinks.

BACKGROUND TO THE INVENTION

High performance in sports, especially endurance sports, requires intake of energy in the form of carbohydrates during training, as well as before and during competition. Athletes participating in endurance events are required to sustain relatively high work rates for a prolonged period, which results in high energy expenditure. To delay the onset of fatigue and optimize prolonged endurance performance, athletes are recommended to fuel the body with energy from carbohydrates. Carbohydrate intake has been shown to improve endurance capacity and performance and athletes are advised to consume carbohydrate at rates of 0.7 g per kilo body weight per hour (30-60 g/h) during endurance events (American College of Sports Medicine. Med Sci Sports Exerc. 2009, 41:709-31). An alternative contemporary recommendation suggests even higher carbohydrate intake rates of up to 90 g/h for athletes competing in intense (ultra)endurance events longer than 2 h (Jeukendrup Eur J Sport Sci 2008, 8:77-86).

Physical exercise involves metabolic oxidation of glucose from glycogen stored in muscular tissue. Intense exercise leads to significant lowering of stored glycogen already after 1-1.5 h of exercise. The amount of stored glycogen is limited but depletion of glycogen can be counteracted by intake of carbohydrates just before and during exercise. The rate at which carbohydrates can be taken up and made available for ATP production in muscle cells is limited by several factors (Rowlands et al. Sports Med (2015) 45:1561-1576). An ideal carbohydrate supplement should offer rapid and complete uptake of carbohydrates when ingested at a rate close to the maximum achievable level (about 90 g/h). The onset of carbohydrate uptake after the first intake and the rate of exogenous carbohydrate oxidation at steady state after repeated intake can be determined by measuring $O_2/CO_2$ gas exchange and tracing ingested carbohydrates in exhaled $CO_2$ using isotope selective techniques.

High carbohydrate intakes during intense exercise are linked to gastrointestinal symptoms such as higher scores of nausea and flatulence (Pfeiffer Med Sci Sports Exerc 2012, 44:344-351). A high rate of absorption is desired. Carbohydrates which are not completely absorbed while passing through the small intestine will have an unwanted laxative effect and may disturb bacterial metabolism in the colon, resulting in increased gas production.

Accordingly, there is also a demand for nutritional supplements that allows high carbohydrate intake without causing unwanted gastrointestinal symptoms.

A consistent finding in published studies is that oral health of elite athletes is poor, both in the case of selected samples attending dental clinics and in more representative evaluations of teams (Needleman Br J Sports Med 2015, 49, 3-6; Ashley Br J Sports Med 2015, 49, 14-19). One major underlying cause is frequent intake of carbohydrate containing acidic sports drinks which causes lowering of the oral pH promoting erosion and dental caries. A relationship between dental caries and frequency of sports drink intake has also been reported in children (Kawashita Community Dent Health 2011, 28, 29-33).

Accordingly, there is a demand for carbohydrate containing nutritional supplements that are less challenging to the oral health.

SE 512093 discloses an oral formulation comprising encapsulated solid carbohydrates together with a non-cariogenic liquid to be used for controlled intake of carbohydrates during exercise. Intake of the required amounts of solid carbohydrates are likely to give a delayed, and even incomplete, uptake, and cause unwanted gastrointestinal symptoms.

Alginates, crosslinked by calcium, have found extensive use in dry formulations and to some extent in wet formulations for controlled release of active ingredients (Hjorth Pharmacy 2002 28:6 621-630; Li Nature Reviews Materials 2016, Article number: 16071).

McEntee, Journal of Applied Polymer Science, 107: 2956-2962 (2008) discloses that release of glucose from calcium-alginate beads can be delayed by using higher alginate concentration. The study is conducted with various saturating concentrations of calcium ions in the beads.

US 2014/0037830 discloses nutritional compositions which are delivered in vivo over long periods of time and suggested as enhancing athletic performance.

WO 2017/186940 and WO 2017/186948 disclose nutritional supplements containing alginate and aimed at reducing unwanted gastrointestinal symptoms. These nutritional supplements comprise high levels of carbohydrates and do therefore constitute a severe challenge to the oral health. Altogether, there is a demand for carbohydrate containing nutritional supplements that are less challenging to the oral health, and which at the same time can allow for high and efficient carbohydrate uptake providing support for high carbohydrate oxidation rates during physical exercise without causing unwanted gastrointestinal symptoms.

DESCRIPTION OF THE INVENTION

It is an object to provide carbohydrate containing nutritional supplements that are less challenging to the oral health.

It is also an object to provide carbohydrate containing nutritional supplements that are less challenging to the oral health, and which at the same time can allow for high and efficient carbohydrate uptake providing support for high carbohydrate oxidation rates during physical exercise without causing unwanted gastrointestinal symptoms.

It is also an object of the invention to provide carbohydrate containing nutritional supplements as set out above with improved storage stability.

By providing carbohydrates in the form of an aqueous hydrogel instead of an aqueous solution, massive dental exposure to the carbohydrates could be avoided. On the other hand, the rate and extent of intestinal uptake of carbohydrates from a hydrogel could be expected to be attenuated, which would be undesired.

The present inventors have surprisingly demonstrated that it is possible to encapsulate a carbohydrate containing aqueous solution in alginate hydrogel, where only a limited amount of the carbohydrate aqueous solution is released in the oral cavity upon consumption, as seen by only a limited decrease in pH as compared to the severe decrease in pH upon the consumption of the same amount of a free carbohydrates containing aqueous solution, and still retain high and efficient carbohydrate uptake providing support for high carbohydrate oxidation rates during physical exercise, and this without causing unwanted gastrointestinal symptoms.

Upon addition of aqueous calcium to aqueous alginate a water-insoluble hydrogel, calcium alginate is formed due to cross-linking of the alginate by calcium. The present inventors have found that the properties of the calcium alginate hydrogel can be modulated by addition of sub-saturating amounts of calcium. Addition of sub-saturating amounts of calcium generates a hydrogel comprising a mixture of calcium alginate and alginate. The alginate can be e.g. sodium alginate, potassium alginate or ammonium alginate, or mixtures thereof.

More specifically, calcium alginate hydrogel beads can be produced by adding drops of an alginate solution to a calcium solution. The alginate solution and the calcium solution contain essentially the same amounts of active ingredients, e.g. sugars. It is preferable to have a small difference in concentration of the major components to obtain slightly higher density of the alginate solution drops which will allow them to sink, avoiding accumulating them at the calcium solution surface. Alternatively, moulded calcium alginate hydrogels can be produced by dispersing an insoluble calcium salt in an alginate solution and slowly releasing the calcium e.g. by the action of an added acid to the mixture. The alginate solution contains the active ingredients, e.g. sugars. The alginate composition of the hydrogel, i.e. the total amount of alginate and the ratio of calcium alginate to the total amount of alginate, are selected to provide hydrogels with the desired properties. The relative amount of calcium, also seen as the % calcium saturation of the calcium alginate, where 100% calcium saturation corresponds to ½ calcium per each mannuronate/guluronate residue in the alginate, determines the level of cross-linking of the alginate and thereby contributes to the properties of the hydrogels. A low % calcium saturation, such as less than 20%, results in alginate hydrogels with a low level of cross-linking, and thereby a low gel strength. A high % calcium saturation, such as more than 80%, results in alginate hydrogels with a high level of cross-linking, and thereby a high gel strength.

Low gel strength gives unwanted properties such as low mechanical strength and inferior encapsulation of carbohydrates, resulting in release of sugar in the mouth during ingestion of the gel hydrogels.

High gel strength gives unwanted properties such as syneresis, which means incomplete inclusion of the liquid solution within the hydrogel and extraction of liquid solution from the hydrogel over time. It has been realized that alginate hydrogels with complete or near complete calcium saturation are leaking water, in which sugars are dissolved. This negative syneresis effect becomes even more apparent over time, such as when prepared hydrogels are stored before consumption.

Accordingly, one aspect of the present invention provides nutritional supplements consisting of an alginate hydrogel, said hydrogel comprising;
a) 0.1 to 5 wt % total alginate, wherein the alginate is 20% to 80% calcium saturated, and
b) an aqueous solution comprising 1 to 75 wt % active ingredients, where the active ingredients are selected from one or more of the ingredients sugars, complex carbohydrates, electrolytes, caffeine, and amino acids.

In one preferred embodiment the alginate hydrogel consists essentially of:
a) 0.1 to 5 wt % total alginate, wherein the alginate is 20% to 80% calcium saturated, and
b) an aqueous solution comprising 1 to 75 wt % active ingredients, where the active ingredients are selected from one or more of the ingredients sugars, complex carbohydrates, electrolytes, caffeine, and amino acids.

The total alginate content of said hydrogel can be 0.1 to 5 wt %, such as 0.1 to 3 wt %, 0.1 to 2.0 wt %, more preferably 0.2 to 1.0 wt %, or 0.3 to 0.8 wt %. With a low alginate content, the release of sugars from the present hydrogel is limited by a rate of diffusion which is essentially the same as from an aqueous solution.

The % calcium saturation can be can be 20% to 80%, such as 20% to 65% or 38% to 46%, more preferably 25% to 55%, more preferably 30% to 55%, more preferably 30% to 46%, even more preferably 30% to 38%.

Accordingly, the alginate hydrogels according to the present invention comprises a mixture of calcium alginate and alginate. The alginates can be sodium alginate, potassium alginate and ammonium alginate or any mixtures thereof.

The gel strength of an alginate hydrogels is determined both by the total alginate content and the % calcium saturation. The preferred gel strength can be obtained by lower total alginate content in combination with a higher % calcium saturation. Likewise, the preferred gel strength can be obtained by higher total alginate content in combination with a lower % calcium saturation.

The gel strength of the alginate hydrogel is also determined by the type of alginate, where high-M-alginate/low-G-alginate requires a higher % calcium saturation to obtain the same gel strength. Analogously, high-G alginate/low-M alginate requires a lower % calcium saturation to obtain the same gel strength and avoid or decrease syneresis.

Accordingly, the nutritional supplements according to the invention can consist of:
i) an alginate hydrogel comprising 0.1 to 1 wt % total alginate, wherein the alginate is 30% to 80% calcium saturated, such as 30 to 65% calcium saturated, or
ii) an alginate hydrogel comprising 0.3 to 5 wt % total alginate, wherein the alginate is 20% to 65% calcium saturated, such as 20% to 55% calcium saturated.

The content of active ingredients in the solution of the hydrogel is preferably 10 to 75 wt %.

The sugar content in the solution of the hydrogel can be 1 to 75 wt %, such as 45 to 70 wt %.

The sugars can be selected from glucose, fructose, sucrose, isomaltulose.

The glucose content in the solution of the hydrogel can be 0 to 35 wt %, 15 to 35 wt %, preferably 15 to 32 wt %.

The fructose content in the solution of the hydrogel can be 0 to 75 wt %, preferably 15 to 50%, e.g. 30 to 50 wt %, also preferably 15 to 30 wt %.

The sucrose content in the solution of the hydrogel can be 0 to 60 wt %, 30 to 50 wt %, or 15 to 30 wt %.

If present the fructose to glucose ratio can be from 0.1:1 to 10:1, such as 0.3:1 to 1.2:1, preferably 0.5:1 to 1:1.

The complex carbohydrates can be selected from starch, maltodextrin, and pectin.

The content of complex carbohydrates in the solution of the hydrogel can be 0.1 to 50 wt %, such as 5 to 20 wt %.

The electrolytes can be selected from chloride, phosphate, carbonate and citrate salts of sodium, potassium, magnesium and zinc.

Optionally the hydrogels can comprise caffeine and vitamins, such as vitamin C.

Optionally the hydrogels can be provided with a flavouring, such as lemon oil.

The aqueous solution is advantageously encapsulated in the hydrogels, allowing only a limited release of active ingredients such as sugars or complex carbohydrates in the oral cavity upon consumption.

In one preferred embodiment the alginate hydrogel comprises:
a) 0.2 to 1.0 wt % total alginate, such as 0.3 to 0.8 wt % total alginate, wherein the alginate is 20% to 80% calcium saturated, such as 20% to 65%, more preferably 30% to 55%, such as 38% to 46%, even more preferably 30% to 46% calcium saturated, and
b) an aqueous solution comprising 36 to 48 wt % glucose, 18 to 24 wt % fructose, and 0.1 to 0.3 wt % sodium chloride.

In another preferred embodiment the alginate hydrogel comprises:
a) 0.2 to 1.0 wt % total alginate, such as 0.3 to 0.8 wt % total alginate, wherein the alginate is 20% to 80% calcium saturated, such as 20% to 65%, more preferably 30% to 55%, such as 38% to 46%, even more preferably 30% to 46% calcium saturated, and
b) an aqueous solution comprising 36 to 48 wt % isomaltulose, 18 to 24 wt % maltodextrin, and 0.1 to 0.3 wt % sodium chloride.

In another preferred embodiment the alginate hydrogel comprises:
a) 0.2 to 1.0 wt % total alginate, such as 0.3 to 0.8 wt % total alginate, wherein the alginate is 20% to 80% calcium saturated, such as 20% to 65%, more preferably 30% to 55%, such as 38% to 46%, even more preferably 30% to 46% calcium saturated, and
b) an aqueous solution comprising 30 to 50 wt % glucose, 15 to 30 wt % fructose, 0 to 30 wt % maltodextrin, and 0.1 to 0.3 wt % sodium chloride.

In another preferred embodiment the alginate hydrogel comprises:
a) 0.2 to 1.0 wt % total alginate, such as 0.3 to 0.8 wt % total alginate, wherein the alginate is 20% to 80% calcium saturated, such as 20% to 65%, more preferably 30% to 55%, such as 38% to 46%, even more preferably 30% to 46% calcium saturated, and
b) an aqueous solution comprising 30 to 50 wt % glucose, 15 to 30 wt % fructose, 0 to 30 wt % sucrose, 0 to 30 wt % maltodextrin, and 0.1 to 0.3 wt % sodium chloride.

The hydrogels according to the present invention can be in the form of hydrogel beads. The hydrogel beads can have a diameter of 1 mm to 10 mm, such as a diameter of 3 mm to 5 mm.

Alternatively, the hydrogels according to the present invention can be moulded into the form of sheets or blocks. Preferably in the size of one portion or serving, ready to be consumed. The hydrogel can preferably be moulded directly in its final packaging.

The alginate hydrogels according to the invention provides:
no or limited syneresis of carbohydrate solution from the hydrogels upon storage
limited release of carbohydrates in the oral cavity
high and efficient carbohydrate uptake providing support for high carbohydrate oxidation rates during physical exercise, and this without causing unwanted gastrointestinal symptoms.

Another aspect of the present invention provides use of nutritional supplements according to the invention as a sport drink or as an energy drink, preferably as a sport drink.

Accordingly, the present invention provides use of nutritional supplements consisting of an alginate hydrogel, said hydrogel comprising:
a) 0.1 to 5 wt % total alginate, wherein the alginate is 20% to 80% calcium saturated, and
b) an aqueous solution comprising 1 to 75 wt % active ingredients, where the active ingredients are selected from one or more of the ingredients sugars, complex carbohydrates, electrolytes, caffeine, and amino acids, as a sport drink or as an energy drink.

More specifically, the invention provides for use of the nutritional supplements as supply of energy in the form of carbohydrates before, during, and/or after exercise, thereby avoiding the cariogenic effects of the oral pH lowering following intake of free carbohydrates in solution.

LEGENDS TO THE FIGURES

FIG. 1. The decrease in pH in dental plaque upon consumption of alginate hydrogel beads comprising a solution of 40 wt % glucose and 20% fructose (solid line), compared to the decrease in pH in the oral cavity upon consumption of a free solution of 40 wt % glucose and 20% fructose (dashed line). The enamel-critical level of pH 5.5-5.7 is indicated.

Figure 2:
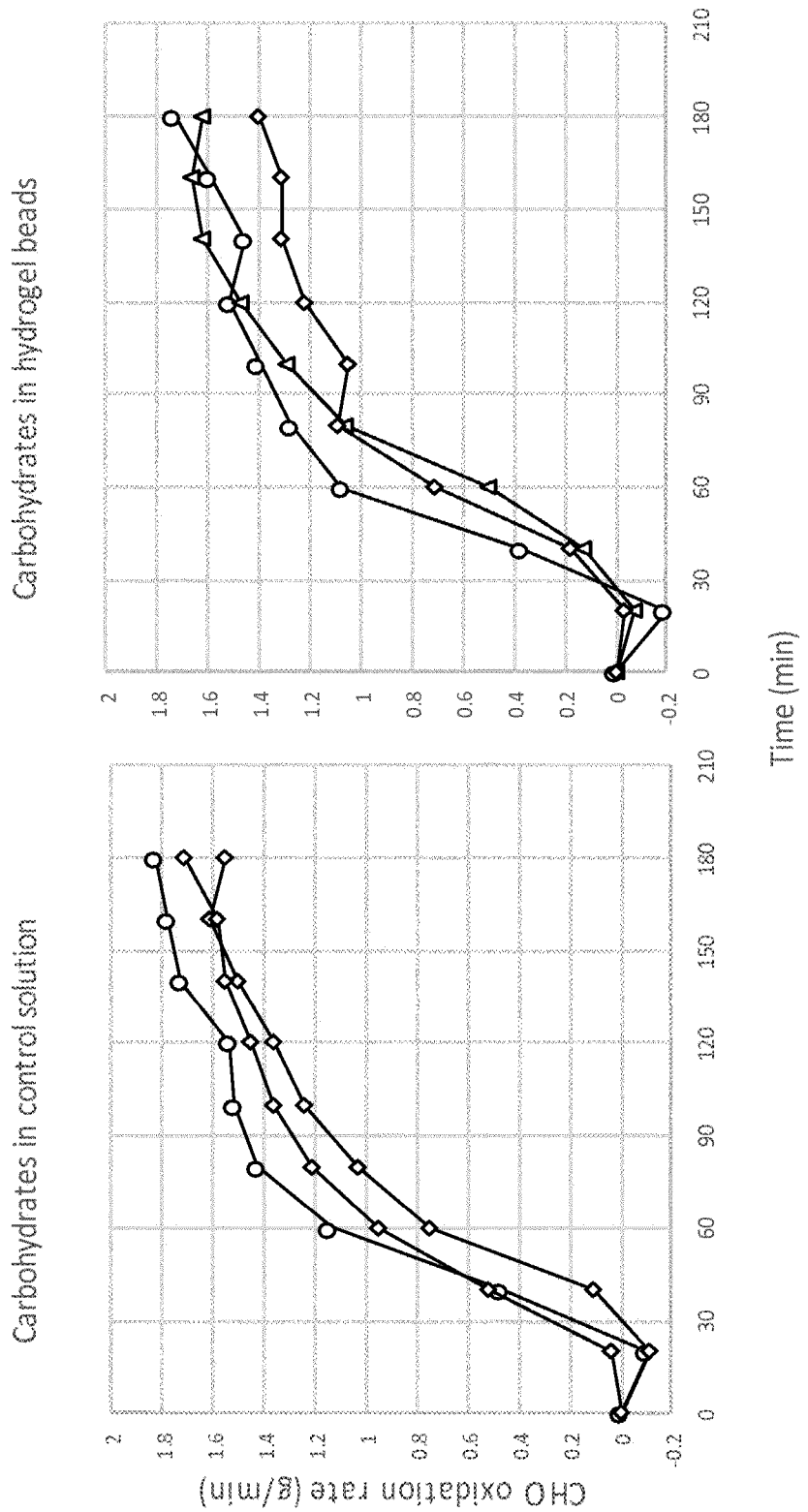

FIG. 2. Exogenous carbohydrate oxidation rates calculated from measured $^{13}C$ isotope enrichment in breath $CO_2$ after carbohydrate intake during physical exercise (Trial A). Cyclists (n=3) ingested 2×36 g carbohydrate at time zero and thereafter 36 g carbohydrate at 20 min intervals. Control solution (Left) and hydrogel beads (Right) contained a 0.8:1 mixture of fructose and glucose (60 wt %). Each curve represents the data from an individual cyclist.

Figure 3:
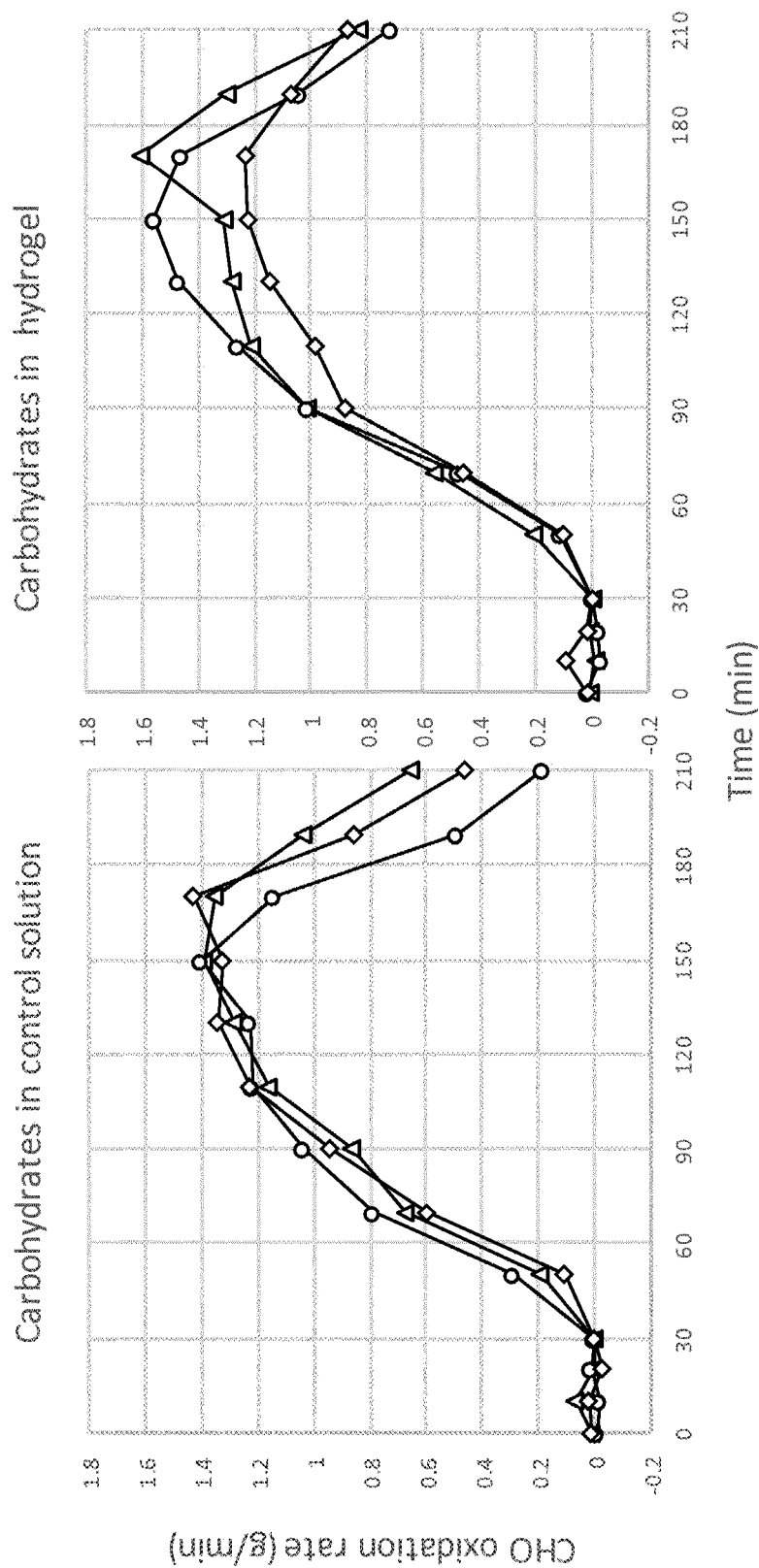

FIG. 3. Exogenous carbohydrate oxidation rates calculated from measured $^{13}C$ isotope enrichment in breath $CO_2$ after carbohydrate intake during physical exercise (Trial B). Cyclists (n=3) ingested 31.7 g carbohydrate at time points 30, 50, 70, 90, 110 and 130 min.

Control solution (Left) and moulded hydrogel (Right) contained a 0.8:1 mixture of fructose and maltodextrin (60 wt %). Each curve represents the data from an individual cyclist.

Figure 4:
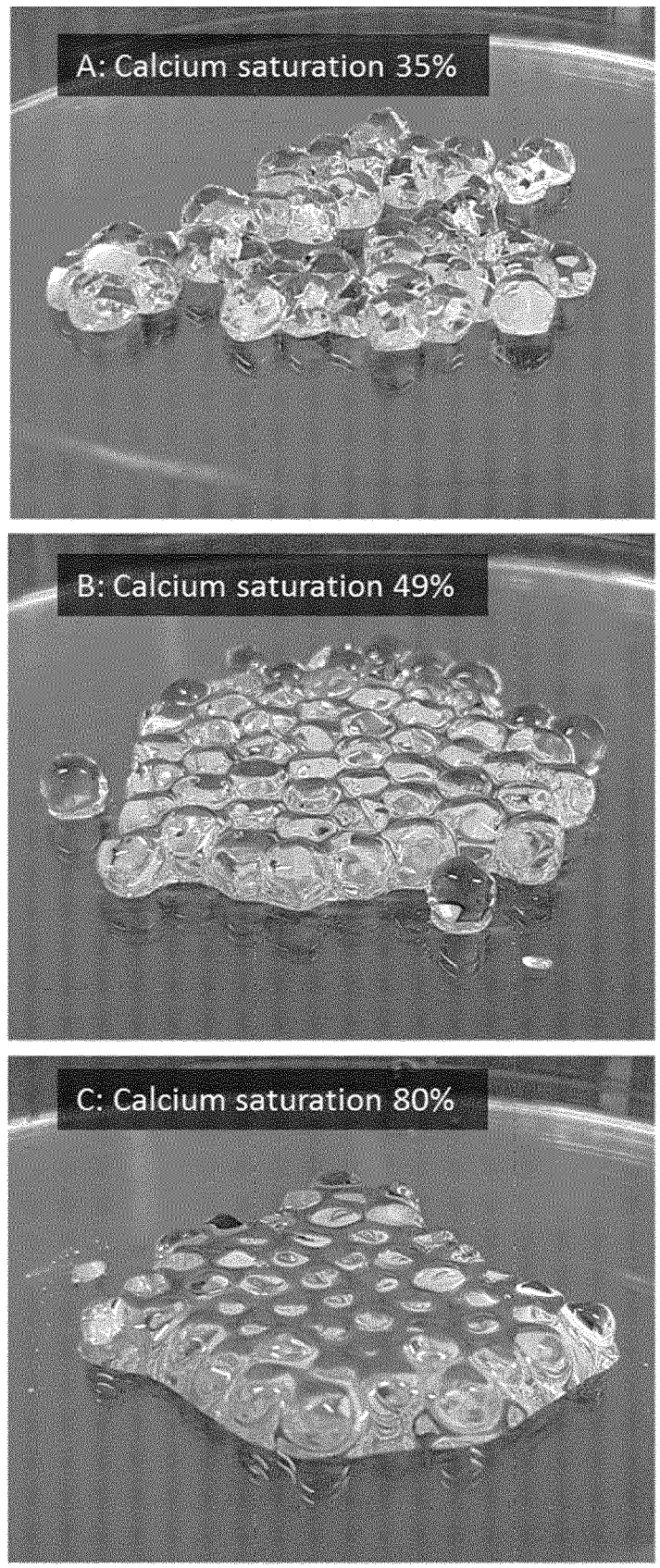

FIG. 4. Photos of gel beads with different calcium content and different degree of syneresis. Beads contained 60% sugar (glucose and fructose). Beads were prepared from sugar solution containing 0.50 wt % alginate (M/G ratio 0.35:0.65).

Figure 5:
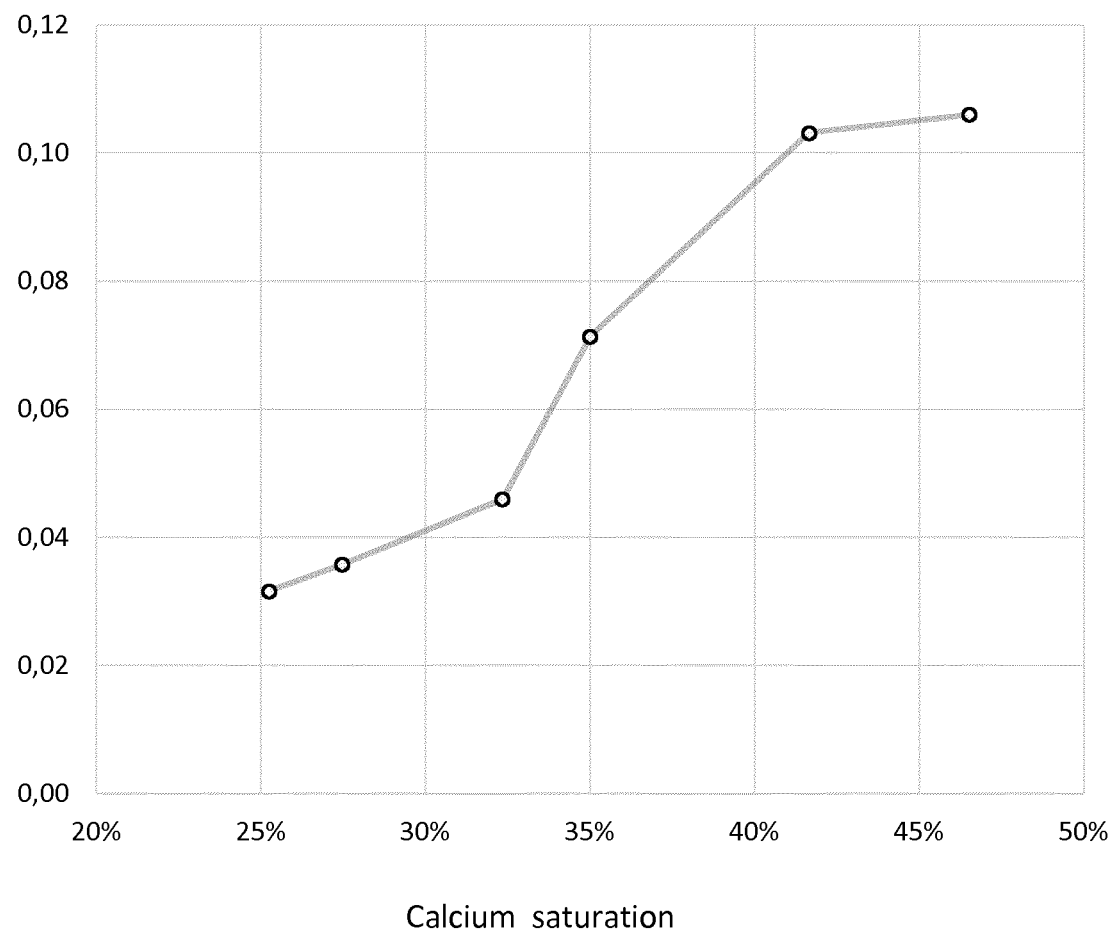

FIG. 5. Effect of calcium saturation on compressibility of alginate beads. Beads contained 60% sugar (glucose and fructose). Beads were prepared from sugar solution containing 0.50 wt % alginate (M/G ratio 0.35:0.65).

DETAILED DESCRIPTION OF THE INVENTION

The present invention is aimed at providing nutritional supplements to be used as sport drinks which result in decreased oral exposure to carbohydrates which could lead to increased risk for dental erosion and caries. By providing the carbohydrates encapsulated in a hydrogel, from which the release of carbohydrates is limited by the rate of diffusion, acute oral exposure to high concentrations of carbohydrates could be attenuated. It was found that use of the nutritional supplements according to the invention resulted in a decreased exposure to low pH, caused by bacterial activity in dental plaque, compared to a plain carbohydrate solution without hydrogel (FIG. 1).

A slow release of carbohydrates was expected to have a reducing effect on the rate of intestinal uptake of carbohydrates. The rate of carbohydrate uptake and metabolic oxidation during exercise was determined using isotope tracing techniques. Unexpectedly, the rate of carbohydrate uptake and oxidation (measured as exhaled $^{13}C$-enriched $CO_2$) was very similar to that of a carbohydrate solution without hydrogel-forming additives (FIGS. 2 and 3). Moreover, gastrointestinal tolerability of the nutritional supplements were unexpectedly high, permitting the product to be ingested during high-intensity training (running or cycling) without disturbing gastrointestinal symptoms (Table 2).

Alginates

Alginate, also called algin or alginic acid, is an anionic polysaccharide distributed widely in the cell walls of brown algae. Alginate acid is a linear copolymer with homopolymeric blocks of (1-4)-linked β-D-mannuronate (M) and its C-5 epimer α-L-guluronate (G) residues, respectively, covalently linked together in different sequences or blocks. The monomers can appear in homopolymeric blocks of consecutive G-residues (G-blocks), consecutive M-residues (M-blocks) or alternating M and G-residues (MG-blocks). All forms of alginate, including high-G alginate/low-M alginate, and high-M alginate/low-G-alginate, can be used according to the invention. Preferably, a high-G alginate/low-M alginate is used to facilitate production, e.g. of gel beads. This implies that the amount of G-blocks is higher than the amount of M-blocks, such as at least 60% G-blocks and not more than 40% M-blocks. The counter ion can e.g. be sodium (sodium-alginate), potassium (potassium-alginate), ammonium (ammonium alginate) or other suitable monovalent cations, or mixtures thereof Calcium Alginate Calcium alginate is a water-insoluble, gelatinous, substance that can be created through the addition of a calcium salt such as aqueous calcium chloride to aqueous alginate.

% Calcium Saturation

As used herein the term % calcium saturation is used to denote the amount of calcium per per each mannuronate/guluronate residue in the alginate, where 100% calcium saturation corresponds to ½ calcium per each mannuronate/guluronate residue.

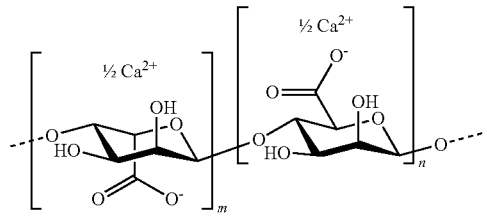

The % calcium saturation determines the level of cross-linking of the alginate thereby contributing to the properties of the gel, specifically the gel strength.

The content of calcium and the total alginate content, and thereby the % calcium saturation, of a batch of alginate hydrogels can be determined using the steps;

Take by weight one part of alginate hydrogel and add 19 parts of 50 mM $K_2EDTA$ and let stand over night (17 h) to bring the mixture to a homogenous solution.

Perform elemental analysis (e.g. by ICP-MS) for determination of calcium concentration. Convert results to molar concentrations (40 g/mol).

The total alginate content is calculated from the amount of alginate according to formulation. If not known, the total alginate content can be calculated from the carbon content which can be determined by elemental analysis after removal of other ingredients as follows:

Place a portion of the solution in a dialysis cell with a 10 kDa cut-off membrane. Wash with a low flow of 25 mM KCl for sufficient time to remove all sugar (24 h). Recover all dialysate by rinsing the dialysis cell with a portion of deionised water and measuring the total volume collected.

Perform elemental analysis for determination of carbon. Convert results to molar concentrations of monosaccharide residues using conversion factor 72 g/mol (6×12 g per mannuronate/guluronate residue containing six carbon atoms). Correct results for the dilution by the dialysis cell rinse.

Calculate calcium saturation (%) as 100×2Ca/residue

Sugars

Sugars that can be used according to invention, but not limited to, are monosaccharides like glucose, fructose, galactose, disaccharides like lactose, maltose, sucrose, lactulose, trehalose, isomaltulose, cellobiose, and hydrolysis products of disaccharides like invert sugar.

Complex Carbohydrates

Complex carbohydrates that can be used according to the invention, but not limited to, are components of starch like amylose and amylopectin and partially hydrolysed products thereof like maltodextrin and glucose syrup.

By "wt %" is meant percentage by weight, also called percentage by mass.

Examples

Calcium saturation and gel properties Gel beads were produced by dripping a solution containing 61% sugar (fructose and glucose, 0.8:1) and 0.50% sodium alginate (M/G ratio 0.35:0.65), viscosity 200-400 mPa·s @ 1%) into a bath containing 59% sugar (fructose and glucose, 0.8:1) and 0.30 wt % (27 mmol/kg, 35 mmol/L) $CaCl_2$) during stirring. Beads were removed from the bath after 1-60 min. The time in bath was varied in order to vary the calcium content, and excess Ca-solution was sieved off. Beads were stored for four days prior to further examination or use. Shorter or longer exposure of beads in the calcium solution was employed for production of beads with lower or higher calcium content.

Calcium content was determined as described above and calcium saturation was calculated using a MW of 198 for M/G residues and 10 wt % loss of drying of the alginate. Loss of sugar solution by syneresis after four days of storage was determined by weighing before and after careful removal of excess liquid. Photos of gel beads with different calcium content are shown in FIG. 4. The calcium saturation in the photos are 35% (A), 49% (B) and 80% (C), respectively. The observed syneresis in the gel beads are <1% (A), 12% (B) and 32% (C), respectively. The degree of syneresis increases with increased calcium saturation in the hydrogel.

Mechanical properties of beads were measured using a Texture Analyzer (HDi, Stable Micro Systems, UK). Beads were compressed at 0.1 mm/s using a cylindrical probe of 1 cm diameter. Measurements were made on 15 beads to determine the force at 40% compression. Results are shown in FIG. 5 and demonstrate that alginate hydrogels prepared with a higher degree of calcium saturation require a larger force to be compressed, i.e they become harder.
Results

TABLE 1

Effect of calcium content and corresponding calcium saturation on gel properties.

| Batch | Total alginate content* | Calcium content | Calcium saturation | Gel strength/ Properties |
|---|---|---|---|---|
| 170217-NF1/4 | 0.5 wt % | 131 mg/kg | 26% | Too soft |
| 170217-NF1/6 | 0.5 wt % | 170 mg/kg | 34% | Somewhat soft |
| 170120-NF1 | 0.5 wt % | 212 mg/kg | 42% | Acceptable |
| 170222-NF1 | 0.5 wt % | 258 mg/kg | 51% | Somewhat hard, slight syneresis |

*Calculated from formulation. Carbon content of 0.5 wt % sodium alginate can be calculated by multiplying wt % value by a factor 72/198.

Clinical Study, Dental Exposure to Low pH
Volunteers

Two healthy adults were recruited among personnel at the Institute of Odontology in Gothenburg, Sweden. They had a normal stimulated salivary secretion, no signs of active caries lesions and no approximal metal or glass ionomer fillings. The study was carried out at the Department of Cariology at the Institute of Odontology in Gothenburg.

The subjects were instructed to refrain from tooth brushing and all other oral hygiene measures from the evening before the day of the test. No chewing gums or lozenges should be used during this period. They should also refrain from eating/drinking, smoking, snuffing etc. during the last hour prior to test.

Study Design and Products

The two volunteers came to the laboratory for evaluation of approximal bio film acidogenicity after consumption of: 1) alginate beads comprising 1.0 wt % total alginate 40% calcium saturated, and a sugar solution of 40 wt % glucose and 20 wt % fructose and 2) a sugar solution comprising 40 wt % glucose and 20 wt % fructose. For each product 15 g was consumed. The subjects were instructed to take the products as three portions into the oral cavity under moderate chewing, and swallow them within 25-30 seconds.

Plaque pH Registration

Measurements of plaque acidogenicity were carried out at two interproximal sites in the region close to where the tablet is placed in using an iridium microelectrode (Beetrode®, MEPH-1; W.P. Instruments, New Haven, Conn., USA). The electrode was connected to an Orion SA 720 pH/ISE Meter (Orion Research, Boston, Mass., USA), equipped with a porous glass reference electrode (MERE 1; W.P. Instruments). A salt bridge was created in a 3 M KCl solution between the reference electrode and one of the subject's fingers. The measurement was carried out before (0 min) and at five different time points (2, 5, 10, 15, 20, 30, 40, 50, 60 and 70 min) after placement and start of use of tablet.

Results

As can be seen in FIG. 1, consumption of 15 g of a solution comprising 40 wt % glucose and 20 wt % fructose led to a dramatic decrease in pH in the oral cavity, well below the enamel critical level at pH 5.5-5.7. On the other hand, consumption of the same amount of 40 wt % glucose and 20 wt % fructose solution encapsulated in alginate beads according to the invention led to only a moderate decrease in pH not reaching the enamel critical level at pH 5.5.

Exogenous Hydrocarbon Uptake and Oxidation
Study Design

Well trained cyclists were held on a diet excluding carbohydrates originating from corn (maize) or sugar cane. Cyclists were tested for their maximal oxygen uptake ($VO_2$max) and the corresponding individual maximal power output (Wmax) was calculated. During one experiment (Trial A), cyclists exercised at 50% Wmax during 180 min. They were given a bolus dose of 2×36 g carbohydrate (fructose/glucose ratio=0.8) in the form of aqueous calcium-sodium alginate hydrogel beads prepared as described in the example above with 35% calcium saturation, or in the form of an aqueous solution, both solutions with 60% carbohydrate content, at time zero, followed by 36 g carbohydrate every 20 min throughout the experiment.

In another experiment (Trial B), cyclist exercised at 55% Wmax during 210 min. Starting at 30 min, cyclists were served portions containing 31.7 g of carbohydrate (fructose/maltodextrin ratio=0.8) in the form of a moulded aqueous calcium-sodium alginate hydrogel prepared as described below or as an aqueous solution, both with 60% carbohydrate content. Carbohydrates were served at 20 min intervals up to 130 min after start. At 150 min and onwards, only water was served.

Moulded hydrogel was prepared by mixing two solutions containing fructose and maltodextrin (0.8:1) and either calcium carbonate (dispersed solid particles) or sodium alginate and citric acid. The mixture, with 60 wt % carbohydrates, 0.40 wt % alginate (M/G ratio 0.35:0.65), 0.030 wt % $CaCO_3$ and 0.050 wt % citric acid gelled within one hour and was allowed to cure for at least four days prior to use. Calcium saturation was 34%.

The carbohydrates (corn-derived glucose, maltodextrin and fructose) had been analysed for their $^{13}C$ enrichment. Before each intake, volumes of exchanged oxygen ($VO_2$) and carbon dioxide ($VCO_2$) were registered (Jaeger Oxycon Pro, Viasys Heathcare, Germany), and breath samples taken in 12 mL Exetainer tubes were analysed for their $^{13}CO_2/^{12}CO_2$ ratio ($\delta^{13}C$) using laser infrared spectroscopy (Delta Ray, Thermo Scientific, Germany). $VO_2$, $VCO_2$ and $\delta^{13}C$ values were used to calculate exogenous carbohydrate oxidation rates, expressed as gram glucose per minute.

Results

Uptake and oxidation of carbohydrates (glucose and fructose), provided in the form of hydrogel beads, was very similar when compared with an aqueous control solution, oxidation rate levels from beads being about 90% of those from the control (Trial A, FIG. 2).

Uptake and oxidation of carbohydrates (maltodextrin and fructose), provided in the form of a moulded hydrogel, was very similar when compared to an aqueous control solution and no difference in oxidation rate levels could be seen except for a tendency for slightly higher oxidation rates for the gel at the end of the trial (Trial B, FIG. 3).

Gastric Distress
Method

Endurance sport athletes, 24-33 years of age, volunteered for testing a carbohydrate-containing hydrogel product in conjunction with training sessions and competition. Athletes ranked themselves on a scale 1-5 where 1 was low level amateur and 5 was elite. They all had previous experiences of gastric distress using carbohydrate supplements during exercise. The hydrogel test product was in the shape of 4-mm beads and contained a solution of glucose 33 wt %, fructose 27 wt %, a high-G alginate 0.5 wt % and had an estimated calcium saturation of 35-40%. One serving contained 40 g of hydrogel beads (24 g of carbohydrates).

Athletes used the product regularly during at least two months within their normal individual training programs, including 1-4 h long high-intensity training sessions with intake of 1-3 servings per hour. Athletes gave scores for experienced gastric discomfort, ranging from insignificant (1) to moderate (sensations of pain or nausea, 2-3), severe (affecting performance, including urge to throw up or defecate, 4-5).

Results

None of the participants experienced gastric discomfort during training after ingesting the test product, compared to no carbohydrate intake. Details on participants and scores are summarized in Table 2.

TABLE 2

Gastric distress

| | | | | | | | Level of experienced GI discomfort[2] | |
|---|---|---|---|---|---|---|---|---|
| Sex | Age | Country | Sport | Height (cm) | Weight (kg) | Athletic level[1] | Traditional carbohydrate products | Hydrogel test product |
| Male | 28 | Sweden | running | 191 | 82 | 4 | 4 | 1 |
| Female | 23 | Sweden | orienteering | 164 | 57 | 5 | 5 | 1 |
| Male | 31 | Norway | running | 176 | 65 | 4 | 4 | 1 |
| Male | 24 | Sweden | orienteering | 184 | 72 | 5 | 3 | 1 |
| Male. | 37 | Sweden | running | 171 | 54 | 4 | 4 | 1 |
| Female | 32 | Sweden | biking | 165 | 55 | 5 | 4 | 1 |
| Male | 26 | Sweden | biking | 177 | 82 | 3 | 3 | 1 |

[1] Athletic level. 1 = amateur, 5 = elite
[2] GI discomfort. 1 = insignificant, 2-3 = moderate, 4-5 = affecting performance

The invention claimed is:

1. A nutritional supplement consisting of an alginate hydrogel, said hydrogel consisting of:
   a) 0.1 to 5 wt % alginate, wherein the alginate is 20% to 80% calcium saturated, and
   b) an aqueous solution comprising 1 to 75 wt % active ingredients,
   where the active ingredients are selected from one or more of the ingredients sugars, complex carbohydrates, electrolytes, caffeine, and amino acids.

2. The nutritional supplement according to claim 1, wherein the alginate is at least 30% calcium saturated.

3. The nutritional supplement according to claim 2, wherein the alginate is at least 38% calcium saturated.

4. The nutritional supplement according to claim 1, wherein the alginate is not more than 65% calcium saturated.

5. The nutritional supplement according to claim 4, wherein the alginate is not more than 55% calcium saturated.

6. The nutritional supplement according to claim 5, wherein the alginate is not more than 50% calcium saturated.

7. The nutritional supplement according to claim 6, wherein the alginate is not more than 46% calcium saturated.

8. The nutritional supplement according to claim 7, wherein the alginate is not more than 38% calcium saturated.

9. The nutritional supplement according to claim 1, wherein the content of alginate in the hydrogel is at least 0.2 wt %.

10. The nutritional supplement according to claim 9, wherein the content of alginate in the hydrogel is at least 0.3 wt %.

11. The nutritional supplement according to claim 1, wherein the content of alginate in the hydrogel is not more than 3 wt %.

12. The nutritional supplement according to claim 11, wherein the content of alginate in the hydrogel is not more than 2.0 wt %.

13. The nutritional supplement according to claim 12, wherein the content of alginate in the hydrogel is not more than 1.0 wt %.

14. The nutritional supplement according to claim 13, wherein the content of alginate in the hydrogel is not more than 0.8 wt %.

15. The nutritional supplement according to claim 1, wherein the content of active ingredients in the solution is at least 10 wt %.

16. The nutritional supplement according to claim 15, wherein the sugar content in the solution is at least 10 wt %.

17. The nutritional supplement according to claim 15, wherein the content of active ingredients in the solution is at least 15 wt %.

18. The nutritional supplement according to claim 17, wherein the sugar content in the solution is at least 15 wt %.

19. The nutritional supplement according to claim 17, wherein the content of active ingredients in the solution is at least 30 wt %.

20. The nutritional supplement according to claim 19, wherein the sugar content in the solution is at least 30 wt %.

21. The nutritional supplement according to claim 19, wherein the content of active ingredients in the solution is at least 45 wt %.

22. The nutritional supplement according to claim 21, wherein the sugar content in the solution is at least 45 wt %.

23. The nutritional supplement according to claim 1, wherein the sugars are selected from glucose, fructose, sucrose, and isomaltulose.

24. The nutritional supplement according to claim 1, wherein the content of complex carbohydrates in the solution is 0.1 to 50 wt %.

25. The nutritional supplement according to claim 24, wherein the content of complex carbohydrates in the solution is 5 to 20 wt %.

26. The nutritional supplement according to claim 1, wherein the complex carbohydrates are selected from starch, maltodextrin, and pectin.

27. The nutritional supplement according claim 1, wherein the electrolytes are selected from chloride, phosphate, carbonate and citrate salts of sodium, potassium, magnesium and zinc.

28. The nutritional supplement according to claim 1, wherein said hydrogel consists of:
   a) 0.2 to 1 wt % alginate, wherein the alginate is 20% to 80% calcium saturated, and
   b) an aqueous solution comprising 10 to 75 wt % active ingredients,
   where the active ingredients are selected from one or more of the ingredients sugars, complex carbohydrates, electrolytes, caffeine, and amino acids.

29. The nutritional supplement according to claim 28, wherein said hydrogel consists of:
   a) 0.3 to 0.8 wt % calcium alginate, wherein the alginate is 20% to 80% calcium saturated, and
   b) an aqueous solution comprising 30 to 50 wt % glucose, 15 to 30 wt % fructose, 0 to 30 wt % sucrose, 0 to 30 wt % maltodextrin.

30. A method comprising consuming the nutritional supplement of claim 1 before, during or after exercise.

* * * * *